United States Patent
Cha

(10) Patent No.: US 8,336,041 B2
(45) Date of Patent: Dec. 18, 2012

(54) COMPILER AND COMPILING METHOD

(75) Inventor: Byung-chang Cha, GimPo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 743 days.

(21) Appl. No.: 12/557,874

(22) Filed: Sep. 11, 2009

(65) Prior Publication Data

US 2010/0107147 A1  Apr. 29, 2010

(30) Foreign Application Priority Data

Oct. 28, 2008  (KR) .................. 10-2008-0105909

(51) Int. Cl.
*G06F 9/45* (2006.01)
(52) U.S. Cl. ..................................... 717/161
(58) Field of Classification Search .................. 717/161
See application file for complete search history.

(56) References Cited

U.S. PATENT DOCUMENTS

| | | | | |
|---|---|---|---|---|
| 5,265,253 A | * | 11/1993 | Yamada | 717/160 |
| 5,491,823 A | * | 2/1996 | Ruttenberg | 717/161 |
| 5,930,510 A | | 7/1999 | Beylin et al. | |
| 2003/0097652 A1 | * | 5/2003 | Roediger et al. | 717/160 |
| 2004/0015916 A1 | | 1/2004 | Click et al. | |
| 2004/0123280 A1 | | 6/2004 | Doshi et al. | |
| 2006/0048123 A1 | | 3/2006 | Martin | |
| 2006/0048124 A1 | | 3/2006 | Martin | |
| 2009/0307675 A1 | * | 12/2009 | Ng et al. | 717/160 |

* cited by examiner

*Primary Examiner* — Philip Wang
(74) *Attorney, Agent, or Firm* — NSIP Law

(57) ABSTRACT

A compiler allocates an unroll_group_number conferred based on a sequence in which a loop body is replicated by loop unrolling to each loop body during loop unrolling based on the optimized number of loop unrolling. The allocated unroll_group_number is added to each instruction included in each loop body. A priority of an instruction is adjusted based on the allocated unroll_group_number during instruction scheduling.

8 Claims, 6 Drawing Sheets

| Instruction No. | Instruction code | Operand List | ⋯ | ⋯ | ⋯ | unroll_group_no |

COMPILER AND COMPILING METHOD

CROSS-REFERENCE TO RELATED APPLICATION(S)

This application claims the benefit under 35 U.S.C. §119(a) of a Korean Patent Application No. 10-2008-105909, filed Oct. 28, 2008, the disclosure of which is incorporated herein in its entirety by reference.

BACKGROUND

1. Field

The following description relates to program optimization performed in a compiling process, and to a compiler and compiling method.

2. Description of the Related Art

A compiler processes a sentence written in a certain programming language and transforms it into a machine language or a code which can be used by a computer. When developing a program in a language such as C or Pascal, a programmer writes sentences one by one using an editor, and these files are called a source code. After a source code is written, a programmer executes a compiler suitable for a language of a source code.

A compiler is executed to deconstruct all sentences according to sentence structure. And, when referring to any other sentence, the compiler generates a resultant code in several consecutive states so that the sentence can be correctly referred to. The result of the compiling is called an object code or an object module, and an object code is a machine code in which a processor can process or execute instructions one at a time.

SUMMARY

In one general aspect, a compiler includes an analyzer configured to analyze intermediate codes of a source application, an unroller configured to allocate an unroll_group_number in units of loop bodies during loop unrolling in an order in which the loop bodies are replicated by the loop unrolling, and an instruction scheduler for scheduling instructions based on the unroll_group_number.

The unroller may be configured to add the unroll_group_number to each instruction included in the loop body.

The instruction scheduler may be configured to schedule the instructions using the unroll_group_number so that instructions included in a loop body with a small unroll_group_number have a high priority.

The instruction scheduler may be configured to adjust priorities of the instructions by subtracting a value obtained by multiplying a weight and the unroll_group_number from an original priority according to a scheduling policy.

In another general aspect, a compiling method includes analyzing intermediate codes of a source application, performing loop unrolling, and allocating an unroll_group_number in units of loop bodies during the loop unrolling in an order in which a loop body is replicated by the loop unrolling, and scheduling instructions based on the unroll_group_number.

The allocating of the unroll_group_number may include adding the unroll_group_number to each instruction included in the loop body.

The scheduling of the instructions may include scheduling the instructions using the unroll_group_number so that instructions included in a loop body with a small unroll_group_number have a high priority.

The scheduling of the instructions may include adjusting priorities of the instructions by subtracting a value obtained by multiplying a weight and the unroll_group_number from an original priority according to a scheduling policy.

The apparatus and method reduces or minimizes a register spill that can be generated during instruction scheduling for an unrolled loop in a compiler. Other features and aspects will be apparent from the following detailed description, the drawings, and the claims.

Figure 1:
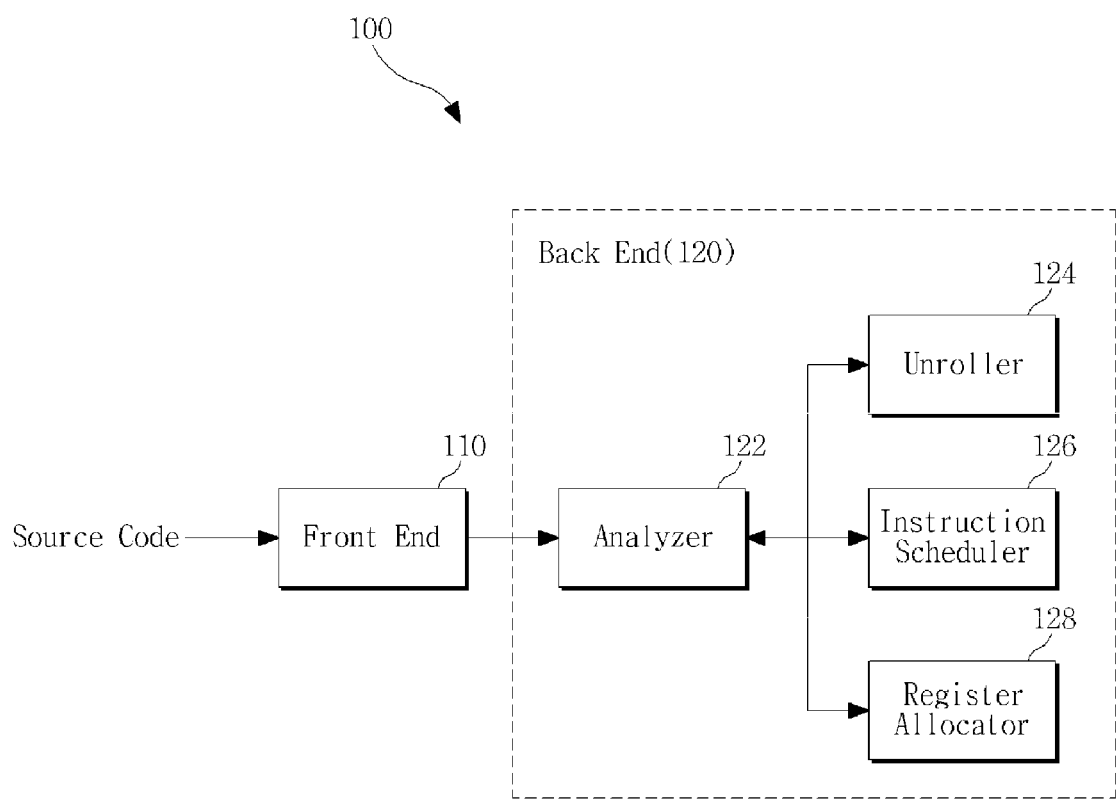
FIG. 1 is a block diagram illustrating an exemplary configuration of a compiler.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the media, methods, apparatuses, and systems described herein. Accordingly, various changes, modifications, and equivalents of the media, methods, apparatuses, and systems described herein will be suggested to those of ordinary skill in the art. Also, descriptions of well-known functions and structures may be omitted for increased clarity and conciseness.

Referring to FIG. 1, a compiler 100 includes a front end program 110 and a back end program 120. The front end program 110 reads a source code and transforms the source code into an intermediate code. An intermediate code is a code that is made in a form suitable for optimization by a compiler 100 to read and parse the source code. Optimization is the process of modifying a system (such as a computer program) to make some aspect of it work more efficiently or to use fewer resources. For instance, a computer program may be optimized so that it executes more rapidly, or is capable of operating with less memory storage or other resources, or draw less power. The back end program 120 transforms the intermediate code into an assembly code. An example of intermediate codes is a tree code of GNU compiler collection (GCC) and a register transfer level (RTL) code.

The back end program 120 receives the intermediate code, performs various optimization procedures through which program performance can be improved, and then outputs the assembly code. The back end program 120 includes an analyzer 122, an unroller 124, an instruction scheduler 126, and a register allocator 128.

The analyzer 122 analyzes intermediate codes of a source application in order to perform various optimization procedures to improve run-time performance of a program generated by the compiler 100. According to some implementations, the analyzer 122 analyzes intermediate codes to generate a data dependence graph (DDG) for a loop unrolled instruction.

The unroller 124 determines the number of optimized loop unrolling times that improves program performance, and performs loop unrolling based on the determined number of optimized loop unrolling times. When source codes are transformed into machine codes by a compiler, for example, a DO loop, a WHILE loop, and a FOR loop are included. When compilation of these loops is optimized, run-time performance of a program generated by a compiler can be significantly improved. Loop unrolling is used to optimize processing of the loops.

Loop unrolling is re-ordering an instruction sequence so that a pipeline can be continuously kept full without being vacated in a computer structure having the pipeline such as reduced instruction set computers (RISCs), that is, in order to prevent a pipeline stall. Loop unrolling is a method for replicating a loop body multiple times and performing them at once to thereby reduce the number of loop iteration times.

The instruction scheduler 126 re-orders instructions in order to reduce or minimize run-time pipeline stalls. In a run-time pipeline stall, a processor waits for a memory patch from a main memory or waits for complicated instructions, such as divide and square root instructions, having plural cycles to be executed to be finished. To this end, when the analyzer 122 analyzes intermediate codes to generate a DDG for a loop unrolled instruction, the instruction scheduler 126 uses the DDG for instruction scheduling. For instruction scheduling, the instruction scheduler 126 first puts instructions in which there is no dependence or dependence is released, for example, an instruction having no edge in a DDG, into a ready queue and pulls out instructions one by one according to a priority.

The register allocator 128 allocates a large number of variables in one function or a basic block to a smaller number of registers. Here, a register spill can occur in a register allocating process. In a register spill, since the number of registers is limited, when the number of registers required at once at a certain spot during program execution is larger than the actual number of registers, a register used by a variable that is not currently used is allocated to another variable. Here, a value of an existing variable is temporarily stored in a memory and is read out to a register when needed.

Typically, in prior systems, each optimization step performed in a compiler is focused on performing optimization for each step. That is, in optimization of a certain step, an exact meaning of an intermediate code generated in a previous optimization step cannot be known and which intermediate code a following optimization step prefers is not considered.

For example, since instruction scheduling is performed, focused on improving or maximizing parallel instruction execution, that is, a degree of instruction level parallelism (ILP), without considering an occurrence of a register spill, a case of excessively hastening an instruction programmed to be processed later occurs. Thus, a register cannot be allocated to a live variable at a certain spot due to a small number of registers in the process of allocating a register later, leading to a spill.

For this reason, memory access by a compiled program is increased, so that execution speed is decreased and power consumption is also increased. Also, since load and store instructions are additionally used in order to handle a spill, the code size is increased. Particularly, when the number of loop unrolling times is large, a register spill frequently occurs. According to some implementations, the compiler 100 performs instruction scheduling in consideration of optimization of an unrolling step, thereby performing efficient compiling.

To this end, the unroller 124 allocates an unroll_group_number, which is given based on an order in which a loop body is replicated by loop unrolling, in units of loop bodies. The unroller 124 can add an unroll_group_number to each instruction included in a loop body so that an unroll_group_number can be reflected when the instruction scheduler 126 determines a priority of each instruction.

In some implementations, the instruction scheduler 126 performs instruction scheduling based on an unroll_group_number allocated in units of loop bodies iterated in the unroller 124 as well as a run-time pipeline stall. That is, when scheduling an unrolled loop, an unroll_group_number allocated for each instruction by loop unrolling optimization is used in consideration of a register allocating process.

The instruction scheduler 126 can reflect an unroll_group_number in instruction scheduling so that a higher priority can be conferred to instructions included in a loop body to which a low unroll_group_number is allocated. To this end, the instruction scheduler 126 can determine a priority of instructions by subtracting a value obtained by multiplying a weight and an unroll_group_number from an original priority according to a scheduling policy. This can be expressed as follows:

$$\text{New priority} = \text{Original priority} - N^* \text{unroll\_group\_number}$$

In some implementations, since a priority is higher as an unroll_group_number is smaller, a live range, meaning a range from an instruction in which a variable is defined to an instruction in which the variable is used, is decreased compared to a typical instruction scheduling method. Therefore, a probability that a register spill occurs is decreased, whereby the number of memory access times is decreased, and an execution time of a compiled program, power consumption and the program size can be decreased.

Figure 2A:
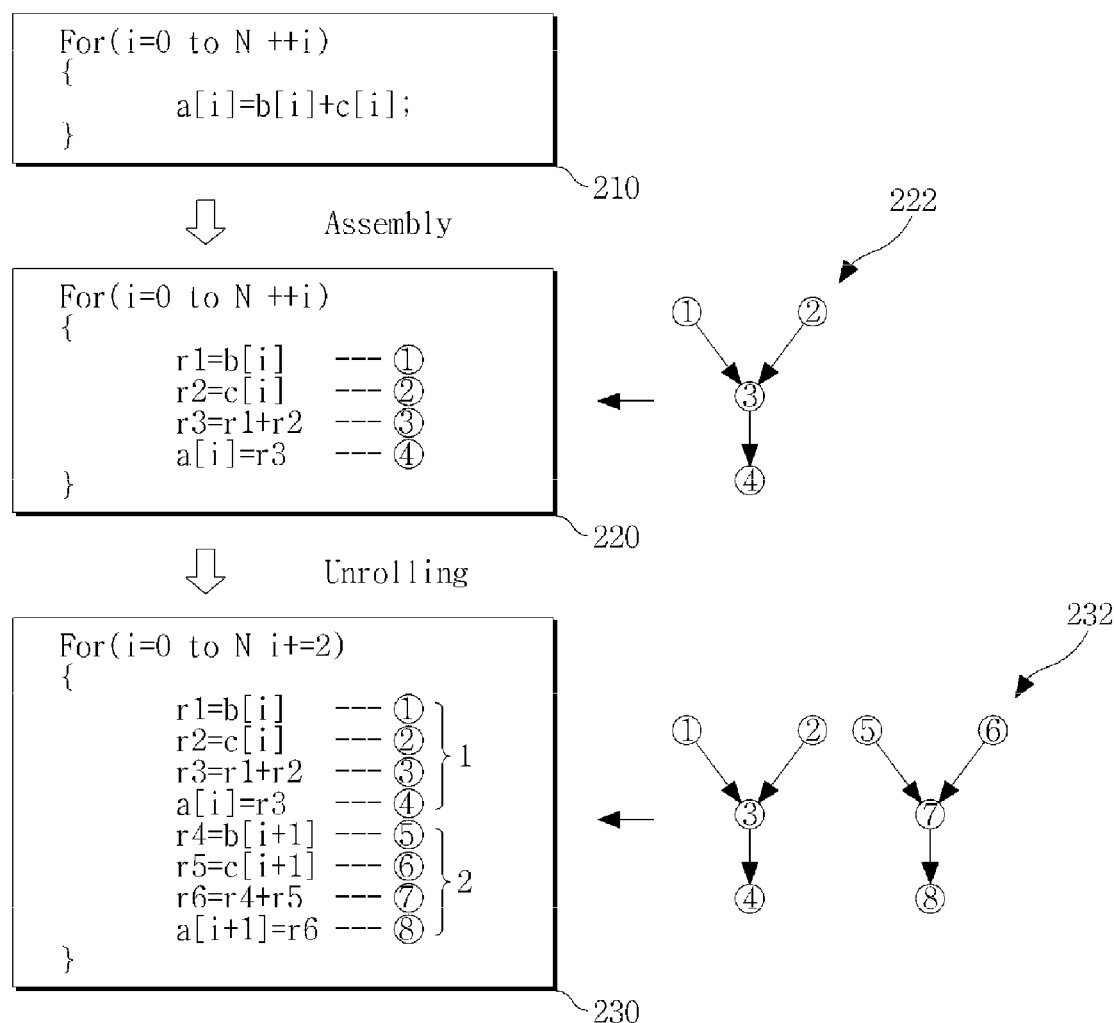
FIGS. 2A to 2B are schematic views illustrating an exemplary program loop and an exemplary loop unrolling result of the program loop.

Referring to FIG. 2A, a simple program loop is shown in a block 210. An instruction "a[i]=b[i]+c[i]" in the loop 210 can be represented by an assembly code 220 that is to be executed in a target machine. The assembly code 220 is represented by an instruction ①, an instruction ②, an instruction ③, and an instruction ④. A DDG 222 represents a data dependence graph of instruction codes of the block 220.

When loop unrolling is performed twice, the assembly code 220 is represented in order of the instruction ①, the instruction ②, the instruction ③, the instruction ④, an instruction ⑤, an instruction ⑥, an instruction ⑦, and an instruction ⑧ as shown in a block 230. In some implementations, the unroller 124 allocates an unroll_group_number in units of loop bodies based on a sequence in which a loop body is replicated. That is, an unroll_group_number 1 is allocated to the instruction ①, the instruction ②, the instruction ③, and the instruction ④, and an unroll_group_number 2 is allocated to the instruction ⑤, the instruction ⑥, the instruction ⑦, and the instruction ⑧. A DDG 232 represents a data dependence graph of instruction codes in the block 230.

Figure 2B:
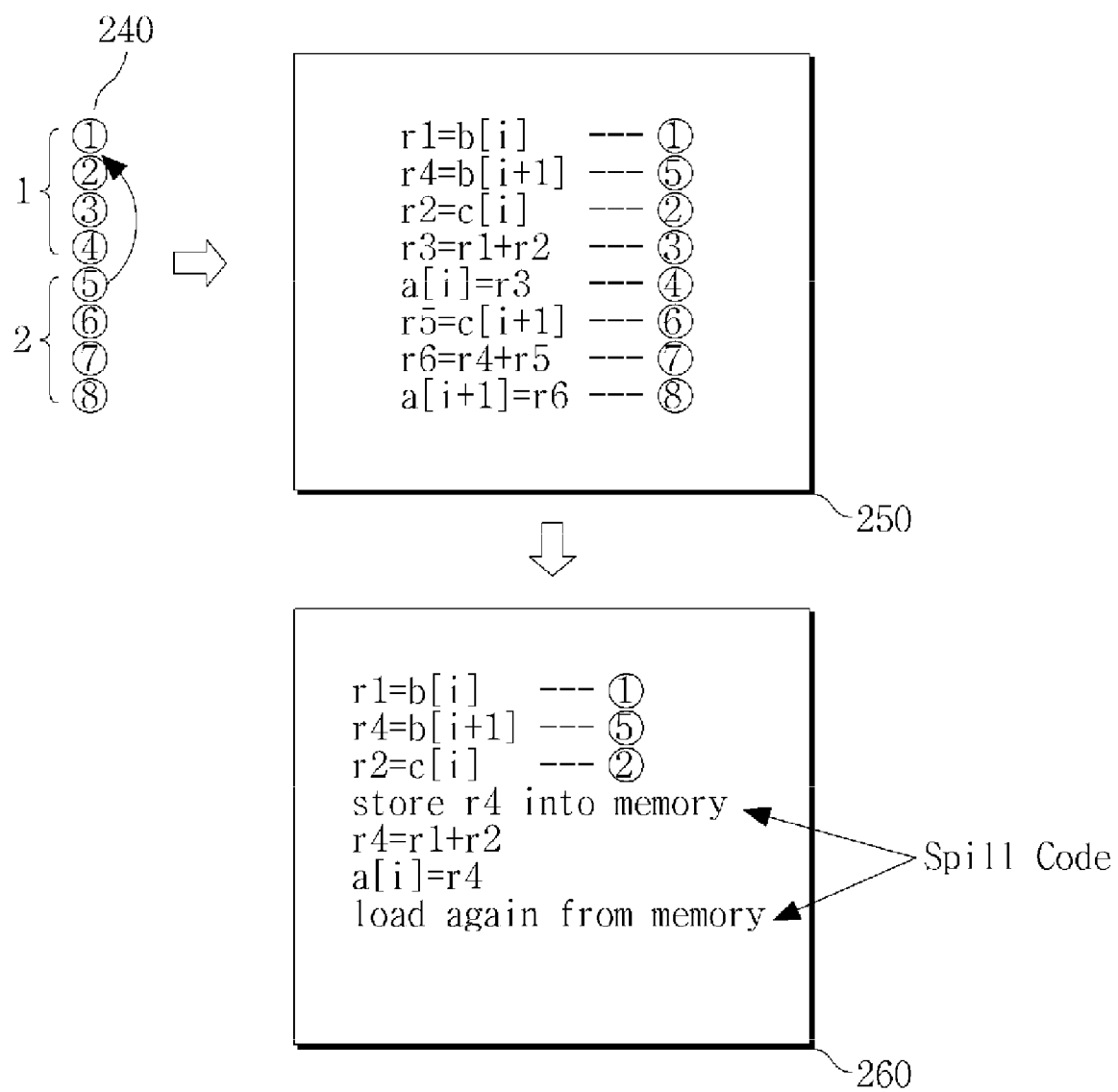

Referring to FIG. 2B, in the case of instruction scheduling in which the instruction ⑤ has a high priority to be performed next to the instruction ① according to a scheduling policy as indicated by reference numeral 240, a sequence of instructions to be processed is determined as shown in a block 250. Here, let us assume that the number of registers in a target machine in which an instruction is to be processed in the above-described sequence is limited to 3.

In this instance, as shown in a block 260, a spill code is generated. That is, variables are loaded into three registers r1, r4 and r2, respectively. Then, in order to store a value obtained by adding values, respectively, stored in the registers r1 and r2, a variable "c" stored in the register r4, which stores a variable that is not currently used, is first temporarily stored in a memory of a target machine, and then a value obtained by adding values stored in the registers r1 and r2 is stored in the register r4. The added value is loaded into a memory address i of a variable "a", and then the variable "c," which is temporarily stored, is loaded into a register again from the memory in order to execute an instruction of a next step. Therefore, a spill code in which a value stored in the register r4 is stored in the memory and a stored value is loaded is generated.

When a spill code is generated as described above, efficiency deteriorates due to loop unrolling performed for optimization in a loop unrolling step. That is, since a live range of a variable is increased in the process of scheduling an unrolled loop, a register spill may occur.

However, when an unroll_group_number allocated is reflected in determining an instruction priority, a probability that an instruction that is to be processed later, for example, the instruction ⑤ of FIG. 2B, will be executed before instructions that are ahead of it in a sequence, for example, the instruction ②, the instruction ③, and the instruction ④, are decreased. Therefore, a probability that a register spill occurs due to an increase of a live range of a variable is decreased.

Figures 3, 4:
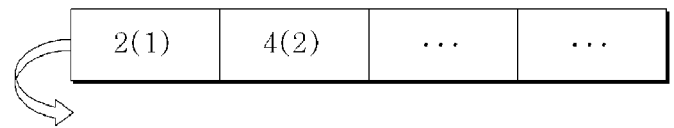
FIG. 3 is a schematic view illustrating an exemplary data structure of an intermediate code.
FIG. 4 is a schematic view illustrating an exemplary instruction queue formed in an instruction scheduler.

Referring to FIG. 3, the unroller 124 allocates an unroll_group_number conferred based on a sequence in which a loop body is replicated by loop unrolling in units of loop bodies while performing loop unrolling. Therefore, an intermediate code includes an Instruction No. field, an Instruction Code (or Operator) field, an Operand List field, and an unroll-group number field.

Referring to FIG. 4, a number in a queue denotes an instruction number, and a number in parentheses denotes an unroll_group_number. In some implementations, instruction scheduling is performed according to an instruction scheduling policy to put instructions into a read queue, and at this time, as indicated by a number in parentheses, an unroll_group_number added to an intermediate code instruction can be reflected in instruction scheduling.

Figure 5:
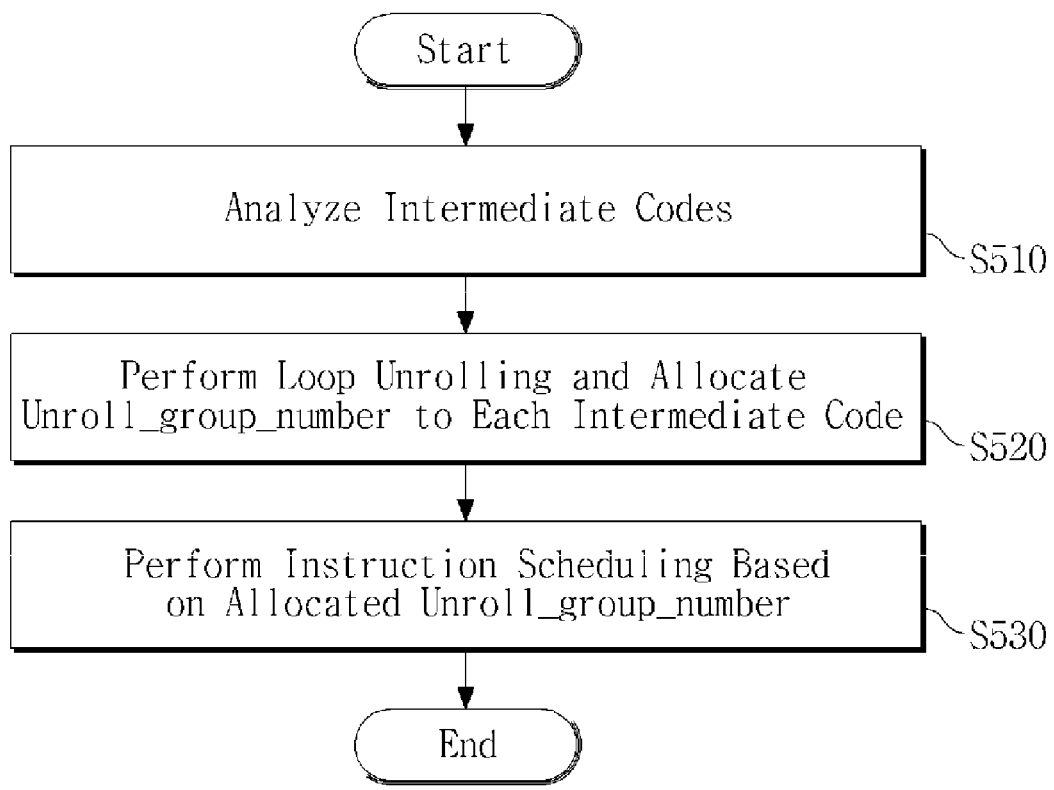
FIG. 5 is a flowchart illustrating an exemplary compiling method.

Referring to FIG. 5, intermediate codes of a source application are analyzed in operation S510. In operation S510, a DDG of a loop unrolled instruction, which is to be used for instruction scheduling by the instruction scheduler, can be generated using analyzed intermediate codes.

Loop unrolling is performed based on the optimized number of loop unrolling times, and while performing loop unrolling, an unroll_group_number conferred based on an order in which a loop body is replicated by loop unrolling is allocated in units of loop bodies of instructions iterated in operation S520. When allocating an unroll_group_number, as shown in FIG. 3, an unroll_group_number can be added to each instruction included in a loop body.

Instruction scheduling is performed based on an unroll_group_number in operation S530. At this time, an unroll_group_number can be reflected in instruction scheduling so that a higher priority is given to instructions included in a loop body in which a low unroll_group_number is allocated. In this case, a priority of an instruction can be adjusted by subtracting a value obtained by multiplying a weight and an unroll_group_number from an original priority according to a scheduling policy.

Figure 6:
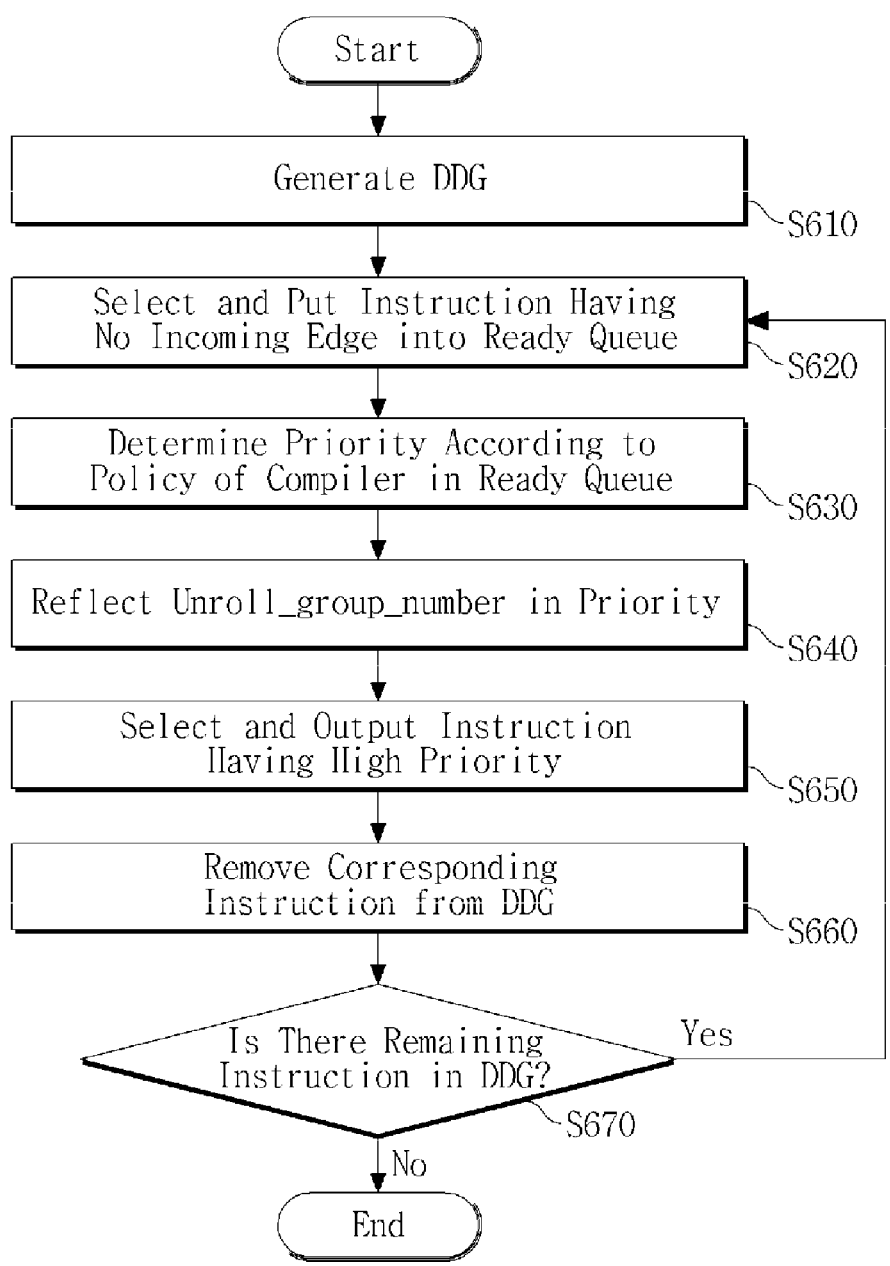
FIG. 6 is a flowchart illustrating an exemplary instruction scheduling method for an unrolled loop.

Referring to FIG. 6, the analyzer 122 generates a DDG of intermediate codes in operation S610. The instruction scheduler 126 selects an instruction having no incoming edge with reference to the DDG and puts it into a ready queue in operation S620. In the ready queue, a priority of instructions is determined according to an instruction scheduling policy of a compiler in operation S630.

The instruction scheduler 126 adjusts a priority in consideration of an unroll_group_number in operation S640. An instruction that has a high adjusted priority is selected and output in operation S650. An output instruction is removed from the DDG in operation S660. It is checked whether or not a remaining instruction exists in the DDG in operation S670.

If there is no remaining instruction in the DDG, instruction scheduling is finished, and if there is a remaining instruction in the DDG, the process returns to operation S620, and the above-described process is repeated until all instructions are processed and there are no remaining instructions. As described above, if an unroll_group_number conferred is used in determining a priority of a scheduling queue, an instruction belonging to an unrolled body of a group having a low unroll_group number has a higher priority than an instruction belonging to an unrolled body of a group having a high unroll_group number, whereby a live range is decreased.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, the computer-readable medium may be distributed to computer systems over a network, in which computer readable codes or program instructions may be stored and executed in a distributed manner.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A compiler comprising:
   an analyzer configured to analyze intermediate codes of a source application;
   an unroller configured to allocate an unroll_group_number in units of loop bodies during loop unrolling in an order in which the loop bodies are replicated by the loop unrolling; and
   an instruction scheduler configured to schedule instructions based on the unroll_group_number,
   wherein the compiler is stored on a storage device.

2. The compiler of claim 1, wherein the unroller is configured to add the unroll_group_number to each instruction included in the loop body.

3. The compiler of claim 1, wherein the instruction scheduler is configured to schedule the instructions using the unroll_group_number so that instructions included in a loop body with a small unroll_group_number have a high priority.

4. The compiler of claim 3, wherein the instruction scheduler is configured to adjust priorities of the instructions by subtracting a value obtained by multiplying a weight and the unroll_group_number from an original priority according to a scheduling policy.

5. A compiling method of a compiler, the compiling method comprising:
   analyzing intermediate codes of a source application;
   performing loop unrolling including allocating an unroll_group_number in units of loop bodies during the loop unrolling in an order in which a loop body is replicated by the loop unrolling; and
   scheduling instructions based on the unroll_group_number,
   wherein the compiler is stored on a storage device.

6. The compiling method of claim 5, wherein the allocating of the unroll_group_number comprises adding the unroll_group_number to each instruction included in the loop body.

7. The compiling method of claim 5, wherein the scheduling of the instructions comprises scheduling the instructions using the unroll_group_number so that instructions included in a loop body with a small unroll_group_number have a high priority.

8. The compiling method of claim 7, wherein the scheduling of the instructions comprises adjusting priorities of the instructions by subtracting a value obtained by multiplying a weight and the unroll_group_number from an original priority according to a scheduling policy.

* * * * *